United States Patent
Pravaz

[11] 3,908,938
[45] Sept. 30, 1975

[54] PARACHUTE

[75] Inventor: Marcel H. Pravaz, Clichy, France

[73] Assignee: Etudes et Fabrications Aeronautiques, Paris, France

[22] Filed: Apr. 17, 1973

[21] Appl. No.: 351,851

[30] Foreign Application Priority Data
Apr. 21, 1972 France .................. 72.14130

[52] U.S. Cl. ............................ 244/152
[51] Int. Cl.² ...................... B64D 17/34
[58] Field of Search .......... 244/152, 142, 145, 149

[56] References Cited
UNITED STATES PATENTS
2,342,287  2/1944  Lisi .................. 244/152
2,657,885  11/1953  Brady ............... 244/152 X
3,599,908  8/1971  Martin ................. 244/152

FOREIGN PATENTS OR APPLICATIONS
583,027  8/1933  Germany .............. 244/152

Primary Examiner—Trygve M. Blix
Assistant Examiner—Barry L. Kelmachter

[57] ABSTRACT

A parachute canopy combined with a halyard for throttling the canopy in a plane parallel to a plane containing the outer peripheral edge of the canopy. The apex portion of the canopy is folded inwardly of the remainder of the canopy and has its apex connected to the halyard. The halyard has a predetermined limited strength.

7 Claims, 8 Drawing Figures

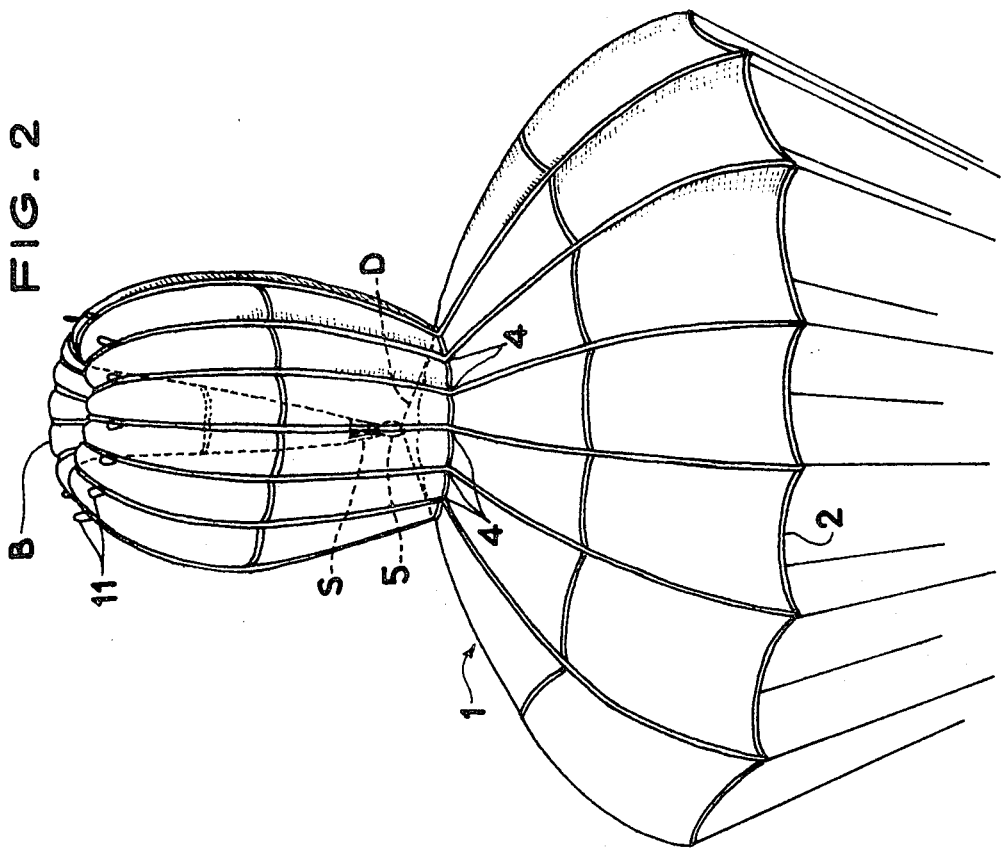
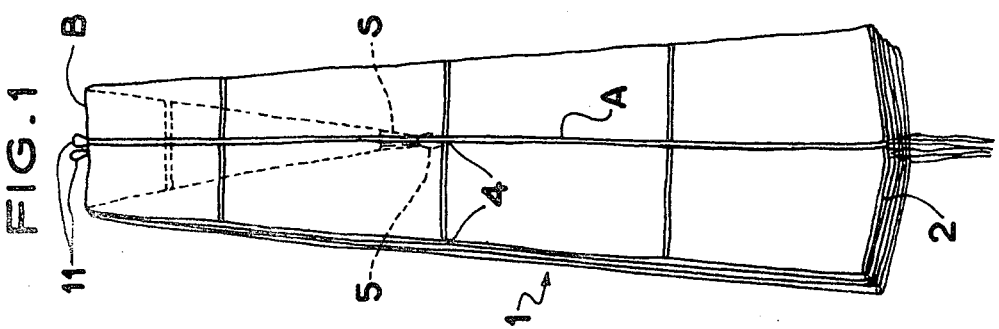

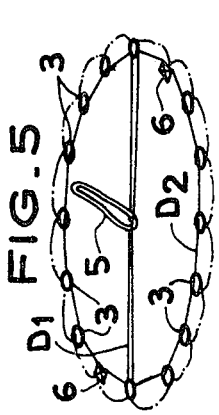
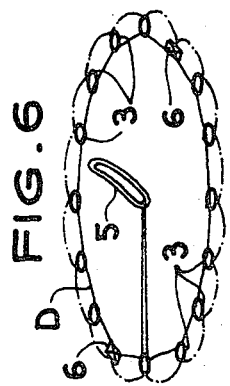
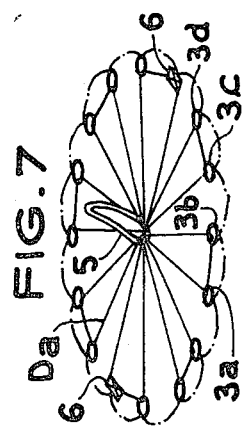
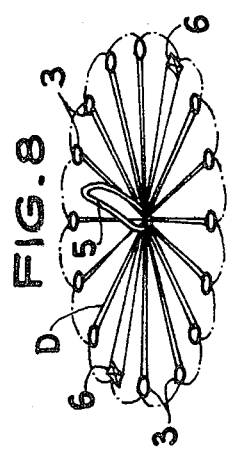
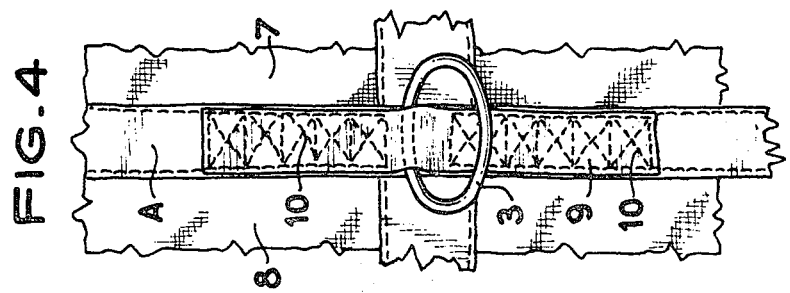
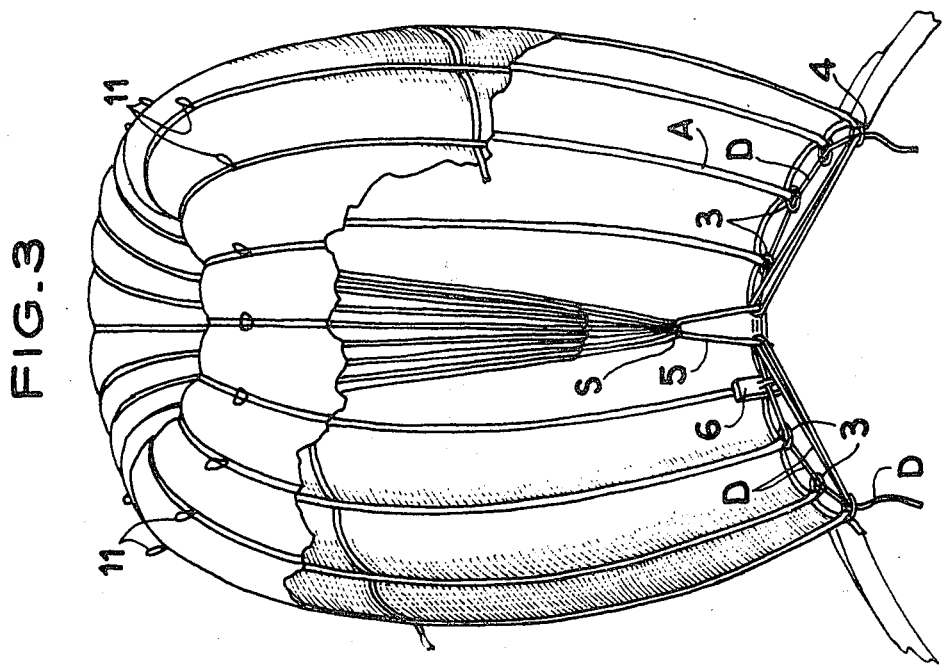

PARACHUTE

The present invention relates to parachutes and more particularly to a device for improving the opening of a parachute.

It is well known that, when they open, parachutes usually take on a "pear shape" before their canopy opens completely.

It is in particular at this stage that a double dome may form.

The time required for completely opening the canopy determines the drop, that is, the vertical distance travelled through by the parachute between the altitude of the point of release or leaving the aircraft and the altitude of the point at which the canopy has completely opened.

The major part of this time for completely opening the canopy is represented by the time during which the canopy has this "pear shape" owing to the narrowness of the opening through which the air enters the canopy.

Moreover, at the moment of complete opening of the canopy a considerable shock occurs.

In order to improve the drop and decrease the shock, it is known to add to the parachute a centre suspension line which is capable of being broken for example by a fuse. However, this method involves a number of complications.

An object of the invention is to provide a parachute which is so arranged that the peripheral edge of the parachute canopy opens very rapidly and thus avoids the stage during which the canopy takes a pear shape and consequently decreases the drop and reduces the shock upon complete opening of the canopy.

The invention provides a parachute comprising means for throttling the canopy in a plane parallel to the plane containing the peripheral edge of the canopy, the apex portion of the canopy being folded inwardly and having its apex connected to said means, and means having a limited strength.

In one embodiment of the invention, said means are constituted by a halyard fixed to the canopy perpendicular to the generatrices of the canopy and adapted to break upon application of a predetermined force.

Preferably, the halyard slides in rings or loops inside the canopy and retains the end of the apex portion.

It will be understood that, with this arrangement, when the opening occurs, and in a first stage of the opening, said throttling means define in the canopy a lower part consistituting a canopy of normal shape but of reduced size and an upper part having externally the shape of a bulb having a part forming a regular corolla whose inner tube is constituted by the inwardly folded apex portion and whose apex is connected to said halyard substantially in the centre of the throttled part.

Further features and advantages of the invention will be apparent from the ensuing description with reference to the accompanying drawings.

In the drawings:

FIG. 1 is a plan view of a parachute according to the invention in a partly folded condition;

FIG. 2 is a perspective view of a parachute according to the invention in a first stage of its opening;

FIG. 3 is a partial view, with a part cut away, of the upper part of the canopy in a first stage of its opening;

FIG. 4 is a partial view of a retaining ring for the canopy throttling halyard, and FIGS. 5 to 8 show various embodiments of the canopy throttling halyard.

In the embodiment shown in FIGS. 1 to 3, a conventional parachute canopy, generally designated by the reference numeral 1, has its inner part, apex portion or vent S which is folded inwardly of the canopy and centered within the latter on a length which depends on the size and design and load of the parachute, as shown in dotted line in FIG. 1. In this embodiment, the apex are centre attachment point S of the apex portion or vent is withdrawn into the canopy to a point located at substantially two-fifths of the length of a generatrix A measured from the peripheral edge 2 of the canopy.

In other words, the length of the apex portion extending into the canopy is substantially three-tenths of the length of the generatrix A in FIG. 1, the fold B being formed at substantially seven-tenths of the distance from the peripheral edge 2.

In the region of the point at which the apex S of the apex portion is located, there is disposed first tie means or a halyard D (FIG. 3) which is adapted to break upon application thereon of a predetermined tensile force and slides in rings 3 or other loop portions or tabs as shown at 4, so that the halyard D extends roughly in a direction parallel to the peripheral edge 2 perpendicular to the generatrices of the canopy, one ring 3 being secured to each stitching corresponding to a generatrix.

This halyard D is also secured to second tie means or the strap 5 of the apex portion or vent and it has a length suitable for throttling the canopy fabric on a circle interconnecting the points 4, the diameter thereof being, for example, equal to one-fourth of the diameter on the peripheral edge 2 of the canopy.

When the canopy opens, it will be understood that owing to this arrangement, the canopy cannot open or develop completely owing to the throttling effect of the halyard D on the fabric of the canopy.

In a first stage, the lower portion of the canopy defined between the peripheral edge 2 and the points 4 forms a dome similar to that of a conventional parachute of small size whose apex portion or vent would be constituted by the orifice defined by the halyard D through which the air enters and inflates the upper part of the canopy the whole of which then assumes a bulb shape constituting a regular corolla whose tube is formed by the part of the apex portion which is withdrawn inwardly where it is retained at its apex or centre attachment point 5 by its strap 5 connected to the halyard D.

The pressure of the air inside the upper bulb-shaped part tends to cause the apex portion to move out of the lower portion of the canopy and thus exerts on the halyard D a pull which tends to tighten the throttling of the canopy.

When the pressure of the air in the upper bulb-shaped part reaches a predetermined value, the halyard D breaks and simultaneously releases the apex portion and the throttled portion of the canopy which then completely opens out in a second stage.

It will be observed that this opening out of the canopy in the second stage concerns only the upper part and in fact constitutes a change of dimension of the lower part.

Consequently, the shock due to full opening is considerably reduced compared to the usual shock which occurs upon the complete opening of a conventional parachute.

In the first stage, the lower part of the canopy behaves in the manner of a conventional parachute of small size whose opening is consequently rapid and the air entering the lower dome retained or throttled by the halyard ensures the immediate inflation of the upper part.

It will be observed that the diameter of the throttling may be variable according to the type of parachute, the delay required for the breaking of the halyard and the load of the parachute.

According to the load and the diameter of the throttling determined by the length of the halyard D, the latter slides in the rings 3 and more or less moves the apex portion or vent away by tightening more or less the throttling.

This permanent variation of the diameter of the throttling in accordance with the force affords an automatic regulation of the force upon the opening of the canopy.

When it opens, the canopy according to the invention does not take on the pear shape of conventional parachutes owing to the very rapid opening of the lower part.

As the throttling halyard D breaks very rapidly, the canopy is completely opened out within a period of time shorter than that required for a conventional parachute and thus considerably reduces the drop.

The breakage of the halyard D may be more or less rapid. It is easy to employ a halyard having at least one point of breakage having a predetermined strength for a given load.

If desired, there may be employed one or more halyard-cutting devices 6 (FIG. 3) of known type, for example of pyrotechnic type.

The automatic regulation of the opening force may be completed by a suitable arrangement of the halyard D for its passage in the rings 3.

FIG. 4 shows an embodiment of the attachment of the rings. Each ring 3 is secured to a stitching between two fabric gores 7, 8. along a generatrix, by means of a tab 9 of fabric stitched at 10 and preferably there is one ring 3 provided on each stitching interconnecting two adjacent gores.

The halyard D may be arranged in different ways in the rings 3 as shown in FIGS. 5–8.

In the embodiment shown in FIG. 5, the halyard D is in two equal parts $D_1$, $D_2$ each of which passes in a closed circuit in one half of the rings 3 and in the strap 5.

In the embodiment shown in FIG. 6, the halyard D is in one piece and its two ends are secured to the strap 5 whence the halyard extends through all the rings in succession and twice through one ring 3 and returns to the strap 5.

In the embodiment shown in FIG. 7, one end of the halyard $D_n$ is secured to the strap 5 and then the halyard is passed through a ring $3a$ then through an adjacent ring $3b$ and returns through the strap 5 when it extends through two successive rings $3_c$, $3_d$ and returns to the strap 5 and so on until it finally returns to the strap where the other end of the halyard is also secured.

In FIG. 8, the halyard D is also continuous and passes through each ring 3 from the strap 5 and then returns to the latter and then extends through the following ring and so on.

In this way, it is possible to achieve an arrangement which in some cases may multiply the force necessary for throttling more or less the canopy.

In each of these embodiments a halyard-cutting device 6 is provided.

Owing to the fact that the vent or apex portion of the canopy is folded inside the canopy, its strap cannot be employed for connecting the canopy to a parachute-extracting device and for maintaining the canopy on a canopy-folding table.

Consequently, a number of loops or rings 11 are provided which are secured to the fold B formed by the folded apex portion, as shown. Such an arrangement is known to be employed on parachute having a centre cord.

Having now described my invention what I claim and desire to secure by Letters Patent is:

1. A parachute canopy having an inner part and an outer peripheral edge and comprising a parachute fabric portion extending from said peripheral edge to said inner part, first tie means for throttling said fabric portion which tie means are connected to said fabric portion substantially in a transverse plane of the canopy when the canopy is in a first stage corresponding to an initial stage of the opening of the canopy, second tie means connecting said inner part of the canopy to said first tie means and restraining, so long as said first tie means are operative, said inner part from moving beyond a predetermined distance away from said plane to a position it will eventually occupy when the canopy is fully opened, said first tie means being connected to said fabric portion in a region of said fabric portion intermediate said peripheral edge and said inner part of the canopy so that in said first state the canopy has a lower part which extends from said outer periphery to said plane and is opened in a substantially normal manner under the effect of air entering the canopy from below an upper part which extends upwardly from said plane to an upper annular portion of the canopy and thereafter extends downwardly from said upper annular portion to said inner part, and means for rendering said first tie means inoperative in the course of the opening of the canopy whereby the canopy can be unthrottled and made free to open to its normal extent in a second stage, said first tie means comprising a continuous closed halyard, and peripherally spaced means secured to the inner surface of the fabric portion of the canopy slidingly combining the halyard with the inner surface of the canopy, and said second tie means comprising a strap which connects the halyard to said inner part so that any pull exerted on said strap tightens the throttling of the canopy.

2. A parachute canopy as claimed in calim 1, wherein the halyard is adapted and arranged to be capable of achieving a multiplication of the magnitude of the pull exerted of the inner part of the canopy for tightening the throttling of the canopy.

3. A parachute canopy as claimed in claim 1, wherein said peripherally spaced means comprises rings which are secured to the inner surface of the fabric portion of the canopy and through which rings the halyard passes freely.

4. A parachute canopy having an inner part and an outer peripheral edge and comprising a parachute fabric portion extending from said peripheral edge to said inner part, said inner part having a centre attachment point at the anex of said canopy, first tie means for throttling said fabric portion which tie means extend in and are connected to said fabric portion substantially in a transverse plane of the canopy and are capable of initially preventing to a major extent a fully opening of the canopy in the radial direction in said transverse plane when the canopy is in a first state corresponding to an initial stage of the opening of the canopy, second tie means extending downwardly from said centre attachment point to said first tie means and connecting said centre attachment point of said inner part of the canopy to said first tie means and capable of restraining, so long as said first tie means are operative in said preventing of full opening, said centre attachment point of said inner part from moving beyond a predetermined distance away from said plane to a position it will eventually occupy when the canopy is fully opened, said first tie means being connected to said fabric portion in a region of said fabric portion intermediate said peripheral edge and said inner part of the canopy so that in said first state the canopy has a lower outer annular part which extends from said outer periphery upwardly and inwardly to said plane and is opened only to an extent allowed by said first tie means under the effect of air entering the canopy from below and an upper part which extends upwardly from said plane to an upper annular portion of the canopy and thereafter extends downwardly and inwardly from said upper annular portion to said inner part, and means for rendering said first tie means inoperative and consequently the second tie means inoperative in the course of the opening of the canopy whereby the canopy is unthrottled and said inner part is no longer restrained and the canopy is made free to open to its normal extent in a second stage.

5. A parachute canopy as claimed in claim 4, wherein the inner part extends inside the remainder of the canopy on a distance between two-fifths and one-half of the length of a generatrix of the canopy measured from the outer peripheral edge of the canopy.

6. A parachute canopy as claimed in claim 4, wherein the first tie means completely throttle the canopy in said transverse plane in said first stage of the opening.

7. A parachute canopy as claimed in claim 4, wherein the first tie means throttle the canopy to a diameter in said plane which is at the most equal to one-fourth of the diameter of the canopy measured on the outer peripheral edge of the canopy in said first stage of the opening.

\* \* \* \* \*